Figure 1:
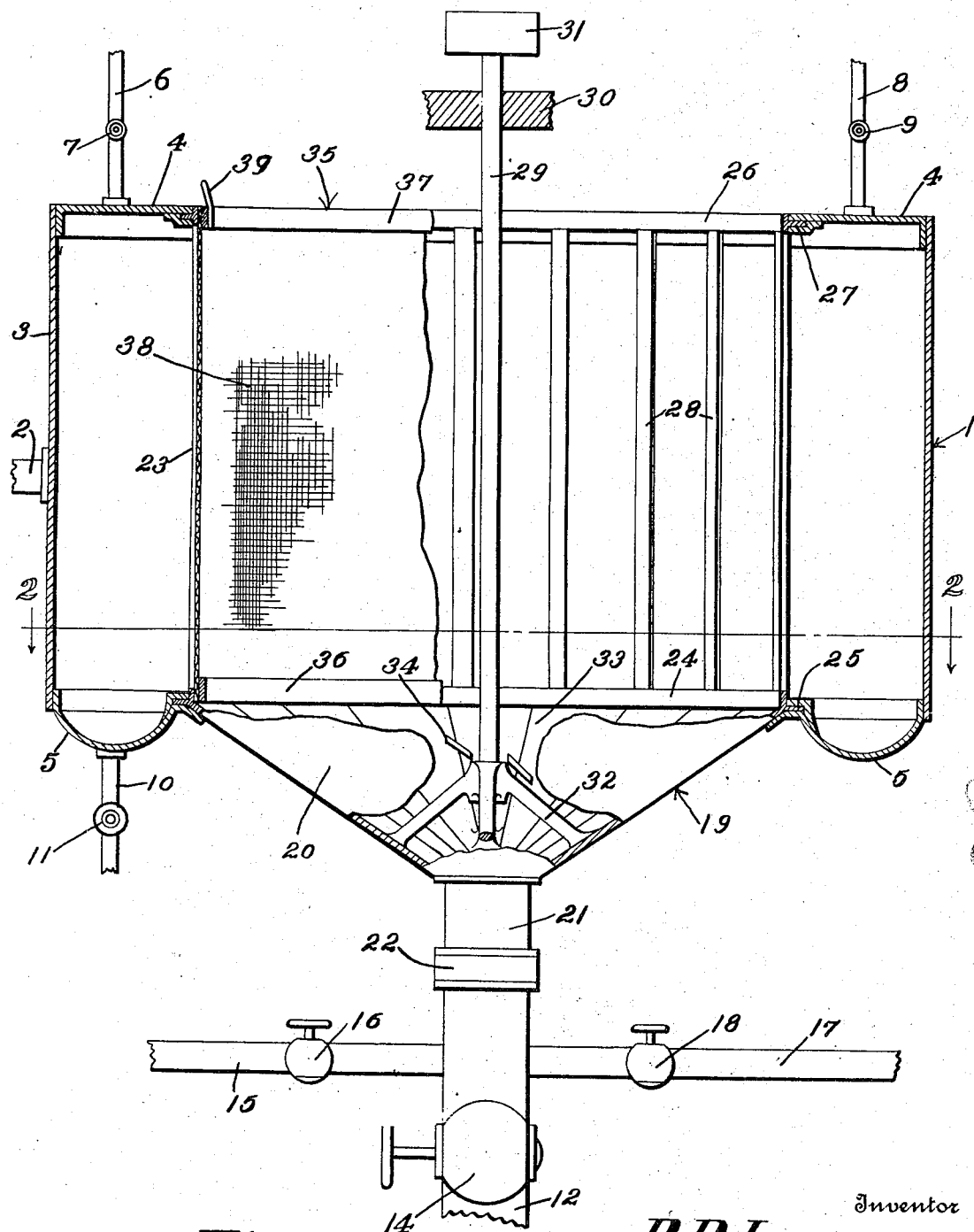

R. D. LUCAS.
FILTER PRESS.
APPLICATION FILED DEC. 9, 1920.

1,415,461. Patented May 9, 1922.

Inventor
R.D. Lucas.
By C.A. Snow & Co.
Attorneys

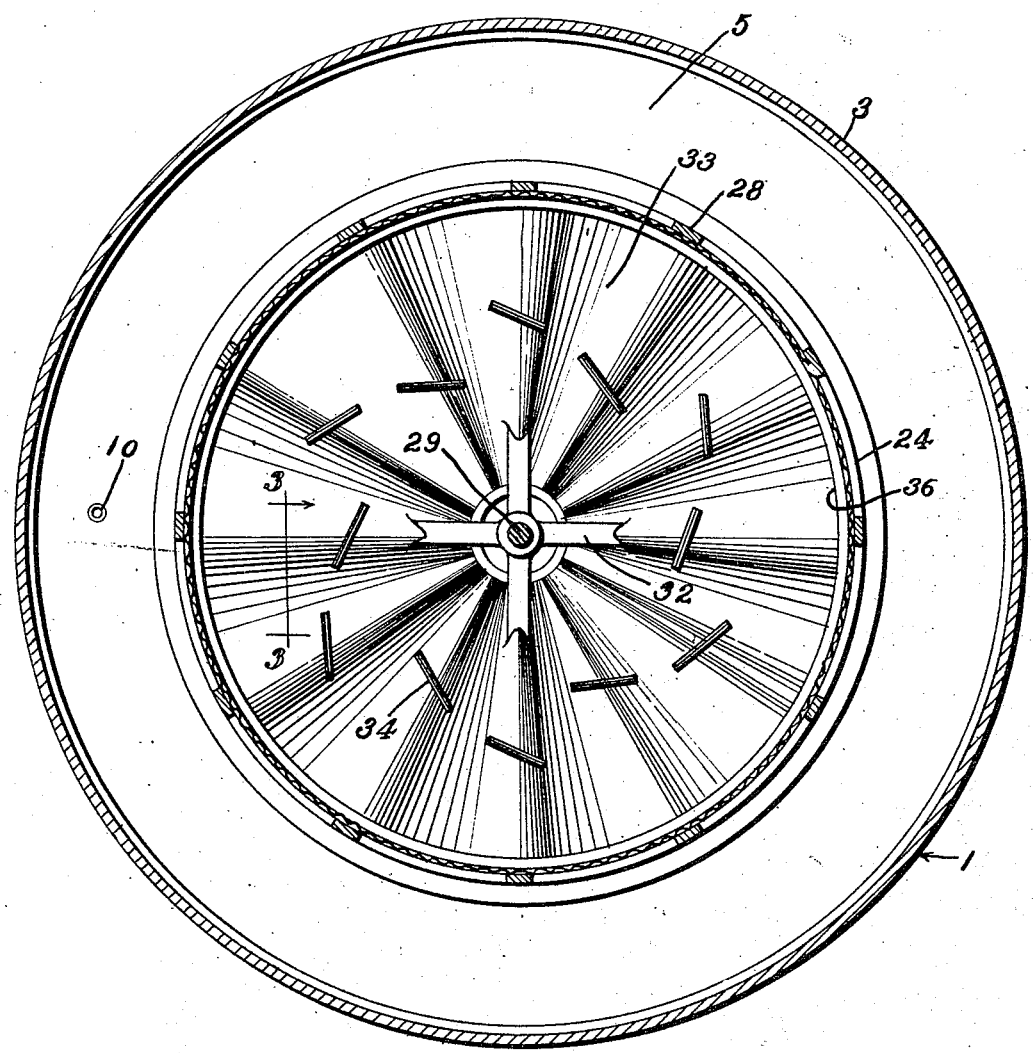
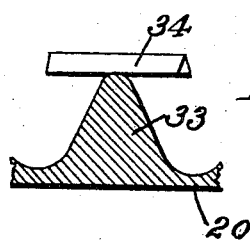

UNITED STATES PATENT OFFICE.

RICHARD DANIEL LUCAS, OF WALLACEBURG, ONTARIO, CANADA.

FILTER PRESS.

1,415,461. Specification of Letters Patent. Patented May 9, 1922.

Application filed December 9, 1920. Serial No. 429,589.

*To all whom it may concern:*

Be it known that I, RICHARD DANIEL LUCAS, a subject of the King of England, residing at Wallaceburg, in the county of Kent, Province of Ontario, and Dominion of Canada, have invented a new and useful Filter Press, of which the following is a specification.

The device forming the subject matter of this application is a centrifugal filter, and the invention aims to provide novel means for supplying the unfiltered solution and for removing the cake.

It is within the province of the disclosure to improve generally and to enhance the utility of devices of that type to which the application appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the drawings:—

Figure 1 shows in vertical longitudinal section, a device constructed in accordance with the invention, parts being shown in elevation; Figure 2 is a transverse section on line 2—2 of Figure 1; and Figure 3 is a fragmental transverse section showing a portion of the rotary filter.

In carrying out the invention there is provided an annular casing 1, supported in any desired way, as indicated at 2. The casing 1 comprises a cylindrical outer wall 3, an annular top 4, and a bottom 5 in the form of an annular trough. The casing 1 is held against rotation.

A pressure conduit 6, which may supply air, communicates with the casing 1 by way of the top 4. A valve 7 under the control of an operator is interposed in the conduit 6. A suction conduit 8 communicates with the casing 1 by way of the top 4, a valve 9 being interposed in the conduit 8. An outlet 10 for the filtered solution leads from the bottom 5 of the casing 1, a valve 11 being interposed in the conduit 10.

The numeral 12 marks a combined drain and inlet pipe in which is mounted a valve 14. A conduit 15, for delivering the unfiltered material communicates with the conduit 12 above the valve 14. A valve 16 is interposed in the conduit 15. A conduit 17, adapted to supply water, communicates with the pipe 12 above the valve 14 and is under the control of a valve 18.

The numeral 19 designates a rotary filter, including a base 20 which may be of inverted conical form, the base communicating with a neck 21. The neck 21 is united with the upper end of the conduit 12 by the coupling 22 which may be a ball-bearing member, the construction being such that the filter 19 may rotate with respect to the pipe 12 without interfering with the delivery of material into the pipe 12, from the rotary filter 19. The rotary filter comprises a body 23 which may be variously constructed, without jeopardizing the utility of the invention. As shown, the body 23 includes a bottom ring 24 connected to the base 20, and journaled, as shown at 25, in the inner edge of the bottom 5 of the casing 1. A top ring 26 is shown, the ring being journaled at 27 in the inner edge of the top 4 of the casing 1. The rings 26 and 24 are connected by upright slats 28. Any other suitable means may be supplied for connecting the rings 20 and 26, it being necessary, merely that openings are provided between the rings 26 and 24.

The means for rotating the filter 19 may embody a shaft 29, supported for rotation in any suitable way, as indicated at 30, the lower end of the shaft being connected by a spider 32 to the base 20 of the filter 19, the numeral 31 designating a pulley or any other suitable instrumentality whereby rotation may be imparted to the shaft 29, and consequently to the filter 19 from a prime mover.

The base 20 of the filter 19 is supplied with radial ribs 33 on which are mounted blades 34, disposed transversely of the ribs.

The numeral 35 denotes, generally, a screen forming a part of the filter 19 and adapted to rotate therewith. If considered expedient, the screen 35 may embody a bottom ring 36, supported on the member 20, a top ring 37 located within the ring 26, and a foraminous body 38 connecting the rings 36 and 37, the top ring 37 being supplied with handles 39, to the end that the screen 35 may be lifted out, upon occasion.

In practical operation, the valve 14 is closed, the valve 16 is opened, the valve 18 is closed, the valve 7 is closed, the valve 9 is opened, and the valve 11 is opened. Then, the unfiltered solution moves along the conduits 15 and passes through the upper portion of the pipe 12 above the valve 14, the solution entering the base 20 of the rotary filter 19 by way of the neck 21. Presupposing that the filter 19 is rotated by means of the shaft 29, the unfiltered solution will be carried upwardly, the upward movement of the solution being promoted, by reason of the fact that the base 20 is supplied with the ribs 33. The unfiltered solution is cast upwardly upon the foraminous body 38 of the screen 35, the liquid passing through the member 38 into the annular casing 1, the liquid leaving by way of the outlet 10, and the solid particles collecting, in the form of a cake, on the inner surface of the member 38.

After the cake has collected, the valve 16 may be closed, thereby cutting off the supply of unfiltered solution. The valve 18 is opened, so that water can flow upwardly into the rotary filter 19, through the pipe 17. The wash water, like the unfiltered solution, responds to centrifugal force, and to the suction created through the conduit 8, the water flowing through the cake on the member 38, and serving to wash the cake. The water passes outwardly into the casing, and flows away through the outlet 10.

When it is desired to remove the cake, the valve 11 is closed, the valve 7 is opened, the valve 9 is closed, the valve 16 is closed, the valve 18 is closed and the valve 14 is opened. Air under pressure now enters the casing 1 through the conduit 6 and forces the cake inwardly, off the foraminous member 38, the cake dropping into the base 20 of the filter 19. The filter 19 may be rotated by way of the shaft 29, whereupon the blades 34 will cut up the cake, the cake passing downwardly and outwardly through the inlet pipe 12. After the cake is in the base 20 of the filter 19, it is possible to close the valve 14 and to open the valve 18, water being supplied, under such circumstances, to the base 20 of the filter 19 for the purpose of converting the cake into a fluid mush which will run out of the base 20, through the pipe 12.

Having thus described the invention, what is claimed is:—

1. In a device of the class described, a casing, a rotary filter journaled in the casing, means for rotating the filter, a combined inlet and outlet member wherewith the filter communicates, a valve in said member, a valve-controlled inlet for unfiltered material, and a valve controlled washing inlet, each communicating with said member between the valve thereof and the filter, a valve-controlled suction conduit, and a valve-controlled pressure conduit, each communicating with the casing.

2. In a device of the class described a casing, a rotary filter journaled in the casing, means for rotating the filter, a combined inlet and outlet member wherewith the filter communicates, means for delivering unfiltered material and washing solution into said member, selectively, at the will of an operator, means for controlling the outflow through said member, and means for supplying suction and pressure to the casing, selectively, at the will of an operator.

3. In a device of the class described, a casing, a rotary filter journaled in the casing and comprising an inverted conical bottom provided with radial ribs, transverse blades carried by the ribs, means for delivering unfiltered solution into the filter, and means for precipitating into the bottom of the filter, for engagement with the blades, a cake which forms upon the filter.

In testimony that I claim the foregoing as my own, I have hereunto affixed my signature.

RICHARD DANIEL LUCAS.